United States Patent
Flygare et al.

[11] 3,766,048
[45] Oct. 16, 1973

[54] ANALYSIS OF POLYMER MIXTURES IN SOLUTION UTILIZING ELECTROPHORETIC LIGHT SCATTERING APPARATUS

[75] Inventors: Willis H. Flygare, Urbana, Ill.; Bennie R. Ware, Arlington, Mass.

[73] Assignee: University of Illinois Foundation, Urbana, Ill.

[22] Filed: Nov. 24, 1972

[21] Appl. No.: 309,272

[52] U.S. Cl.............................. 204/299, 204/180 R
[51] Int. Cl................................................ B01k 5/00
[58] Field of Search....................... 204/180 R, 299; 356/102, 103

[56] References Cited
UNITED STATES PATENTS

| | | | |
|---|---|---|---|
| 2,379,158 | 6/1945 | Kalischer........................ | 356/102 X |
| 2,412,602 | 12/1946 | Chambers et al........... | 204/180 R X |
| 2,494,441 | 1/1950 | Hillier............................. | 356/102 X |
| 3,498,905 | 3/1970 | Strickler....................... | 204/180 R X |
| 3,519,353 | 7/1970 | Franz et al........................... | 356/102 |
| 3,708,402 | 1/1973 | Bean................................. | 204/299 |

*Primary Examiner*—John H. Mack
*Assistant Examiner*—A. C. Prescott
*Attorney*—Charles J. Merriam et al.

[57] ABSTRACT

An electrophoretic light scattering apparatus for determining the electrophoretic mobility and diffusion coefficient of a macromolecular polymer in solution is disclosed. More particularly, the charged macromolecules are driven through the solution by an electric field developed between two charged electrodes in a modified electrophoretic cell. The electric field is alternately enabled and disabled during the determination to prevent excessive heat build-up in the solution and the resultant convection of macromolecules which would distort the measurements. A laser provides an incident light beam which is passed through the cell perpendicular to the direction of the macromolecule flow so that the autocorrelation function or, alternatively, the frequency spectrum of the light scattered from the macromolecules can be observed at low scattering angles. The scattered light, in addition to having a frequency distribution curve proportional to the diffusion coefficient of the macromolecules, is Doppler shifted by an amount proportional to the electrophoretic mobility of the macromolecule in the scattering region. Because each species of polymers has a unique electrophoretic mobility and hence Doppler shift, the apparatus is useful in quantitatively analyzing a mixture of several different polymers in solution (e.g., life-like enzymes such as blood) to identify the polymers and their relative concentrations.

13 Claims, 5 Drawing Figures

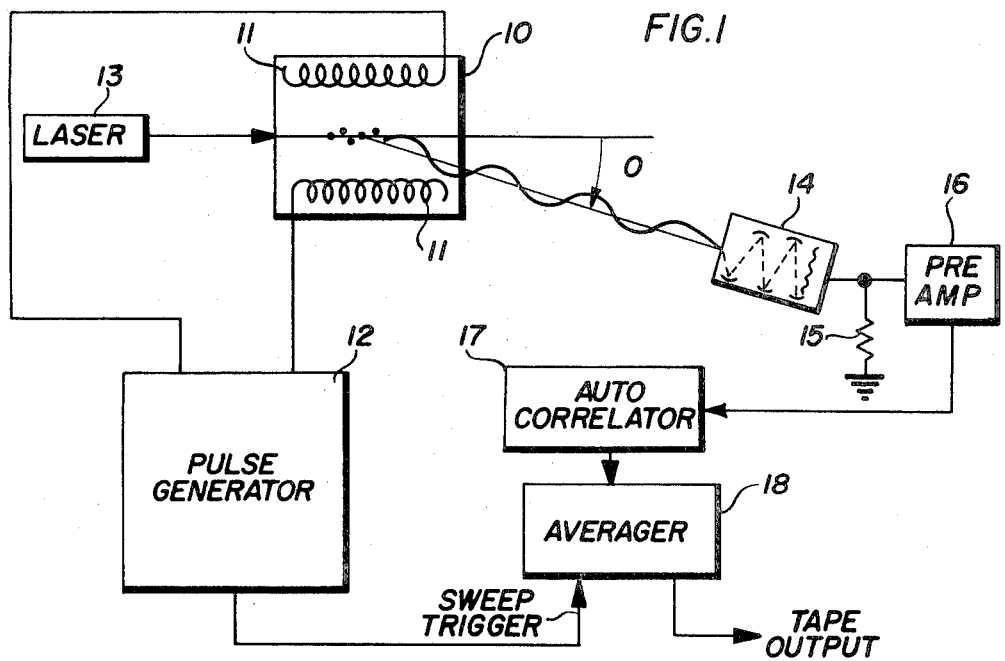
FIG.1
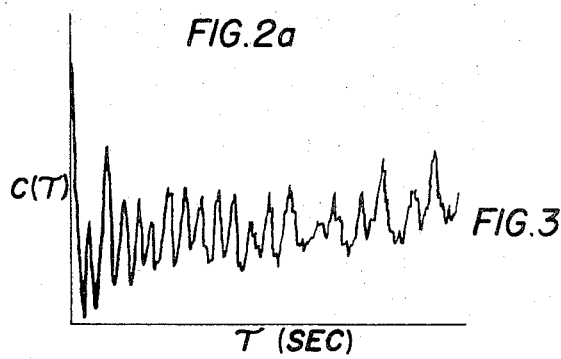
FIG.2a
FIG.2b
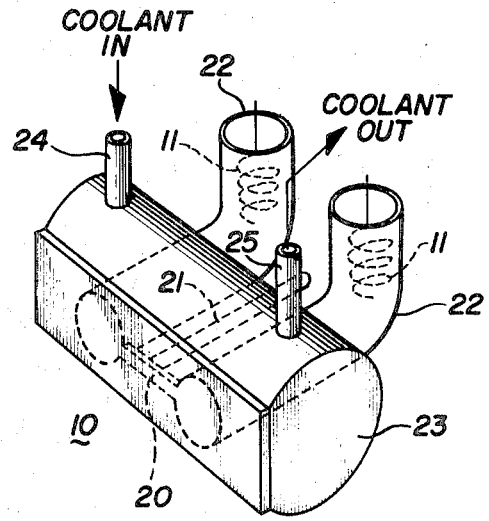
FIG.3
FIG.4

3,766,048

ANALYSIS OF POLYMER MIXTURES IN SOLUTION UTILIZING ELECTROPHORETIC LIGHT SCATTERING APPARATUS

BACKGROUND OF THE INVENTION

The present invention relates generally to an apparatus for determining the electrical characteristics of polymers in solution and more particularly to an apparatus combining electrophoresis techniques with laser beat frequency spectroscopy for quantitatively analyzing mixtures of polymers in solution.

The invention described herein was made in the course of or under a grant from the National Science Foundation, an agency of the U.S. Government.

Heretofore, a standard laboratory technique commonly known as electrophoresis has been used to experimentally determine certain electrical characteristics of polymers, e.g., their electrophoretic mobility and diffusion coefficient. Having determined these characteristics for various polymers, electrophoresis techniques have been used to quantitatively analyze polymer mixtures, identifying the different species of polymers in the mixture and their relative concentrations.

One typical prior art arrangement utilizes a Tiselius electrophoresis cell wherein macromolecular polymers are initially restricted to a portion of the cell by a boundary. An electrophoresis cell of this type also includes electrodes for generating an electric field across the cell perpendicular to the boundary so that the charged macromolecules are attracted to the electrode of opposite polarity located on the other side of the boundary. Accordingly, when the boundary is removed, each macromolecule moves through a gel or other supportive medium toward that electrode at a velocity determined by its own particular electrophoretic mobility, the consistency of the gell and the strength of the electric field. Different species of polymers having differing electrophoretic mobilities, depending on factors such as their size, shape and charge, however, so that they move with different velocities responsive to the electric field.

Consequently, the component polymers comprising a mixture can be identified by determining their respective electrophoretic mobilities which are proportional to their displacement from the boundary at a predetermined time after removal of the boundary. Further, the width of the resultant distribution curve for any particular species of polymers is representative of that polymer's diffusion coefficient, thereby aiding in its identification. Finally, the total area under the distribution curve is indicative of the realtive concentrations of the various polymers in the mixture. Thus, once the electrical characteristics of a particular polymer have been determined, that polymer can subsequently be identified in a mixture of polymers in solution through electrophoresis.

One disadvantage of prior art electrophoresis, however, is that it does not provide a value for the electrophoretic mobilities of the macromolecules in a solution. That is, because the results differ depending on the gel or other supporting medium used, there is always some doubt raised as to whether the supporting medium is degrading the sample or otherwise introducing other factors into the analysis.

Another primary disadvantage is that the charged macromolecules may be subject to convection due to resistive heating, thereby distorting the electrophoretic mobility and/or diffusion coefficient attributed to the polymer. Because a typical prior art electrophoresis experiment requires 12 to 48 hours before the relatively slow-moving macromolecules of the different polymers are sufficiently displaced in the gel to be observed, the electric field applied across the electrophoresis cell generates a great deal of heat. Thus, the electric field which can be used must be limited to levels at or below that electric field which generates the maximum amount of heat tolerable without adversely affecting the test results.

SUMMARY OF THE INVENTION

The electrophoretic light scattering apparatus of the present invention employs the frequency analysis of scattered light to determine the electrophoretic mobility and diffusion coefficient of a macromolecular polymer in solution. Further, the apparatus may be utilized to quantitatively analyze a mixture of polymers in solution (e.g., life-like enzymes such as blood) to identify the polymers and their relative concentrations. The apparatus includes an electrophoretic cell containing the solution to be investigated. Means are included for applying an electric field across the solution of charged macromolecules, causing them to move at a constant velocity in a direction parallel to the electric field. The electric field is alternately enabled and disabled so that higher electric fields may be used without generating excessive heat build-up in the solution with attendant convection of the macromolecules. A source of monochromatic electromagnetic radiation provides an incident light beam intersecting the path of the charged macromolecules in the scattering region of the electrophoretic cell so that the radiation scattered from the charged macromolecules is Doppler shifted due to their translational motion. Because different species of polymers move through the solution with different velocities, depending on their respective electrophoretic mobilities, a particular amount of Doppler shift is characteristic of a single species of polymers. Accordingly, detector means are also included for analyzing the Doppler shift and frequency distribution of the scattered light to determine the electrophoretic mobilities and diffusion coefficients of the various polymers and to identify the different polymers and their relative concentrations in the solution.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 1 is a block diagram of electrophoretic light scattering apparatus in accordance with a preferred embodiment of the invention;

FIGS. 2a and 2b are representative of the autocorrelation function and corresponding power spectrum, respectively, of a mixture of macromolecular polymers in solution;

FIG. 3 is a perspective view of an electrophoretic cell which may be utilized in conjunction with the electrophoretic light scattering apparatus of the present invention; and FIG. 4 is a top elevational view of the electrophoretic cell shown in FIG. 3.

PREFERRED EMBODIMENT OF THE INVENTION

Referring now to FIG. 1, a solution of macromolecular polymers (e.g., blood) that has been dialyzed to a known pH and ionic strength is filtered into a modified electrophoretic cell 10 through millipore filters which remove any excessively large particles.

The electrophoretic cell 10 includes a pair of electrodes 11 for developing an electric field therebetween whenever a pulse generator 12 applies a potential to the electrodes 11. Application of the electric field to the solution causes the charged macromolecules to migrate in a direction parallel to the electric field toward the electrode of opposite polarity. The drift velocity ($V_d$) of each individual macromolecule, in turn, is equal to its electrophoretic mobility ($\mu$) times the electric field strength (E). Thus, the different species of polymers move through the solution at different velocities responsive to a constant electric field, depending on various factors, such as their size, shape and charge, which combine to determine their corresponding electrophoretic mobility. It should be understood, of course, that variations in the net charge of the macromolecules can be effected by changing the pH and/or the ionic strength of the solution. Accordingly, the electrophoretic mobilities can be modified to move the macromolecules through the solution at a slower rate to increase the resolution between different species of macromolecular polymers.

As previously mentioned, the strength of the electric field that can be applied across the solution when prior art electrophoresis techniques are utilized is limited to levels where the charged macromolecules will not be subject to convection due to resistive heating of the solution. The electrophoretic light scattering apparatus of the present invention, however, facilitates the quantitative analysis of a mixture of polymers in solution so that an experiment may be completed in less than 1 hour. Moreover, the potential applied to the electrodes 11 by generator 12 is pulsed so that higher fields that are typically used in electrophoresis can be employed. That is, because the interval between pulses is normally five to ten times the pulse duration, there is ample time for any heat generated by the passage of the current through the solution to be dissipated. The pulses are also of alternating polarity to prevent the formation of concentration gradients.

A laser 13 provides a source of monochromatic electromagnetic radiation that is applied to a region in the solution between the electrodes 11 designated to be the "scattering region." Although the selection of a particular laser and the angle of incidence of the light beam is solely a design consideration, in the present embodiment the incident light is supplied by an $Ar^+$ laser 13 on the 5145 Angstrom line and applied to the scattering region in a direction normal to the electric field for optimum results. During intervals when the electric field is pulsed on, causing the charged macromolecules to migrate toward the electrode of opposite polarity, the incident light beam is scattered and Doppler shifted by each macromolecule as it moves with a constant drift velocity parallel to the electric field through the scattering region. The magnitude of the Doppler shift is directly proportional to the velocity and, as a result, the electrophoretic mobility of the macromolecule. Consequently, for mixtures of polymers, each particular species produces a Doppler shift of the incident light representative of its own corresponding electrophoretic mobility. Thus, the electric field shifts the spectral frequency distributions of a mixture of different polymers having distinct electrophoretic mobilities to different frequency centers.

The diffusion, or random motion, of the charged macromolecules comprising a particular species of polymers also gives rise to the creation and decay of concentration fluctuations, creating a Lorentzian frequency distribution of scattered light with half-width proportional to the diffusion coefficient of that particular polymer. Although each polymer in a species has the same electrophoretic mobility, the diffusion of the macromolecules in directions other than parallel to the electric field broadens the frequency spectrum of the light scattered by macromolecules of the species.

The spectrum of Doppler shifted light scattered from the solution at a particular scattering angle $\theta$ is collimated over a predetermined distance to a photomultiplier 14 (e.g., RCA No. 7265) where it is detected and subsequently mixed, or heterodyned, with a component of the incident light beam to permit analysis of the lower difference, or beat, frequencies by audio frequency apparatus. This technique is more commonly known as heterodyne beat frequency spectroscopy.

It is evident from FIG. 1 that the distance between scattering macromolecules which is probed in the solution depends on the scattering angle $\theta$. When $\theta$ is small (forward scattering), large spatial differences in the solution are probed. When $\theta$ is large (back scattering), on the other hand, distances are probed which approach the wave length of the incident radiation. It is clear that the concentration fluctuations in a solution of macromolecules will decay or be created at a slower rate for larger distances in the solution. Thus, low angle scattering leads to narrower-width frequency distributions than high angle scattering. Further, at low scattering angles, the incident light substantially exceeds the intensity of the scattered light, so that heterodyning can be accomplished.

The resulting signal can be analyzed by measuring either its autocorrelation function, $C(\tau)$, which is a measure of the correlation between concentration fluctuations in a solution of macromolecules or, alternatively, by measuring its frequency spectrum. In any event, according to the Wiener-Khintchine theorem, the autocorrelation function, $C(\tau)$, is related to the spectrum, $I(\omega)$, of the scattered light by the equation:

$$I(\omega) = \frac{1}{2\pi} \int_{-\infty}^{\infty} C(\tau) e^{i\omega\tau} d\tau$$

so that the frequency spectrum of the Doppler shifted light can be obtained by Fourier transformation.

Accordingly, the photocurrent from the photomultiplier 14 is coupled to a parallel circuit, one side of which is a resistor 15 coupled to ground and the other side of which is a preamplier 16 (e.g., Keithley Model 103) with variable high and low frequency cutoffs. The resultant output signal from preamplier 16 is then analyzed by a detector arrangement having the characteristics of an autocorrelator or, alternatively, a spectrum analyzer.

In the present embodiment, the detector includes an autocorrelator 17 (e.g., Fabri-Tek Model SD-75) which is associated with an averager 18 comprising a digital computer (e.g., Fabri-Tek Model 1070). It should be understood, however, that the autocorrelator 17 can be replaced by a spectrum analyzer (not shown) to obtain the frequency spectrum directly without Fourier transformation. To simplify the present description, however, it will be assumed that an autocorrelator is being utilized. A trigger signal from pulse generator 12 is coupled to the averager 18 simultaneously with the initiation of the electric field across the electrophoretic cell 10. The detector is then delayed for a preselected time interval in order to allow the macromolecules in the solution to reach a steady state at which time it determines the autocorrelation function for the polymer mixture. The electric field is subsequently removed until the system again reaches an equilibrium so that a new measurement may be made.

The detector calculates the autocorrelation function of the photocurrent by holding the first data point, multiplying it by each successive data point, and storing the products so that the autocorrelation function is repeatedly calculated and signal averaged. Finally, the data from averager 18 is taken out on paper tape for analysis. If the average correlation function was determined, it may then be Fourier transformed to obtain the frequency spectrum. Thus, a typical electrophoretic light scattering experiment in accordance with the present invention is completed in 5 minutes to 1 hour as compared with the 12 to 48 hours required for an electrophoresis experiment using prior art methods.

An illustration of the autocorrelation function for a mixture of polymers in solution is shown in FIG. 2a, and the resulting spectrum derived therefrom by Fourier transformation is shown in FIG. 2b. The various peaks identified generally at P in FIG. 2b correspond to different polymers in the solution, their displacement ($\Delta f$) from the origin being representative of their electrophoretic mobilities. Also, the width of the peaks (P) is indicative of their different diffusion coefficients while their amplitudes correspond to their relative concentrations in the solution. Thus, having previously determined the various electrical characteristics of known polymers, it is possible to quantitatively analyze an unknown solution containing a mixture of polymers.

The modified electrophoretic cell 10 shown in FIG. 3 is useful in performing the electrophoretic light scattering experiments. More particularly, the cell 10 includes a pair of Ag-AgCl electrodes 11 inserted directly into the solution which, in turn, is contained in a substantially U-shaped chamber. A narrow rectangular chamber 20 connects the L-shaped tubes 22 comprising the "sides" of U-shaped chamber. Accordingly, when a potential is applied to the electrodes 11, an electric field running parallel with the length of chamber 20 is developed. A light pipe 21 is provided to conduct the incident light beam to the portion of chamber 20 known as the scattering region so that it is normal to the electrical field and hence the translational motion of the charged macromolecules in the solution. Coolant is introduced into a reservoir 23 encompassing most of the U-shaped chamber through tube 24 so that a coolant circulated therein is in thermal contact with the solution in the U-shaped chamber. The coolant, in turn, exits through tube 25. A top view of the electrophoretic cell 10 is shown in FIG. 4.

Accordingly, there has been shown an apparatus for analyzing a mixture of macromolecular polymers, such as blood, by combining electrophoresis techniques with laser beat frequency spectroscopy to measure the frequency distribution and the Doppler shift of light scattered from the polymers in a solution under the influence of a pulsed electric field. The apparatus may be used to simultaneously measure the diffusion coefficient and the electrophoretic mobility of the various charged macromolecules thereby providing a method of quantitatively analyzing mixtures of polymers in solution. In this manner, it is possible to identify and determine the relative concentrations of the various polymers comprising the mixture. Further, because the measurements are accomplished in a relatively short period of time, the electric field applied across the electrophoretic cell may be pulsed thereby reducing the heat generated due to the current flowing between the electrodes. Also, by alternating the polarity of the pulses applied to the electrodes, the electric field is reversed after each measurement so that concentration gradients of the macromolecules are not formed during the experiment.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

We claim:

1. An electrophoretic light scattering apparatus for determining the respective electrophoretic mobilities and diffusion coefficients of several species of macromolecular polymers in solution, said apparatus comprising in combination:

means for establishing an electric field across said solution to move said macromolecules through said solution at a velocity proportional to said electrophoretic mobilities in a direction parallel with said electric field;

laser means for generating a light beam of monochromatic electromagnetic radiation incident on said macromolecules, said light beam being scattered by said macromolecules to provide frequency distributions representative of said diffusion coefficients and Doppler shifts proportional to said electrophoretic mobilities of said macromolecular polymers; and detector means for analyzing said scattered light to determine said respective electrophoretic mobilities and diffusion coefficients of said several macromolecular polymer species in solution.

2. An electrophoretic light scattering apparatus in accordance with claim 1 including pulse means developing a pulse train for alternately enabling and disabling said electric field during the determination of said electrophoretic mobilities and said diffusion coefficients to reduce heat build-up in the solution thereby preventing convection of said macromolecules.

3. An electrophoretic light scattering apparatus in accordance with claim 2 wherein said detector means includes trigger means for enabling said detector means a predetermined time interval after said electric field is enabled to allow said macromolecules to reach a steady state before said scattered light is analyzed.

4. An electrophoretic light scattering apparatus in accordance with claim 2 wherein said pulse means includes means for alternating the polarity of said pulses, said electric field being periodically reversed responsive to said pulses for preventing the formation of concentration gradients due to accumulation of said macromolecules.

5. An electrophoretic light scattering apparatus in accordance with claim 1 wherein said detector means includes photomultiplier means for detecting and heterodyning said scattered light with said incident light beam to permit frequency analysis of said scattered light at beat frequencies in the audio frequency range.

6. An electrophoretic light scattering apparatus in accordance with claim 1 wherein said detector means includes autocorrelation means and averaging means, said autocorrelation means determining the autocorrelation function of said scattered light during successive intervals comprising data points, said averaging means holding the first data point and multiplying it by each successive data point so that the autocorrelation function is repeatedly calculated and averaged.

7. An electrophoretic light scattering apparatus in accordance with claim 1 wherein said detector means includes spectrum analyzer means and averaging means, said spectrum analyzer means determining the frequency spectrum of said scattered light during successive intervals comprising data points, said averaging means holding the first data point and multiplying it by each successive data point so that the frequency spectrum is repeatedly calculated and averaged.

8. An electrophoretic light scattering apparatus in accordance with claim 1 including electrophoretic cell means comprising a single non-interrupted chamber for holding said solution.

9. An electrophoretic light scattering apparatus in accordance with claim 8 wherein said means for generating said electric field includes a pair of electrodes, said electrodes being positioned at opposite ends of said chamber to establish said electric field across said solution.

10. An electrophoretic light scattering apparatus in accordance with claim 9 wherein said electrophoretic cell means includes light conducting means positioned adjacent to said cell and between said electrodes, said light conducting means conducting said light beam from said laser means to enter said chamber means incident to the direction in which said macromolecules flow.

11. An electrophoretic light scattering apparatus in accordance with claim 10 wherein said light conducting means is positioned normal to the direction in which said macromolecules flow.

12. An electrophoretic light scattering apparatus in accordance with claim 1 wherein said laser means includes an $Ar^+$ laser emitting an incident light beam on the 5145 Angstrom line.

13. An electrophoretic light scattering apparatus for determining the electrophoretic mobility and diffusion coefficient of a macromolecular polymer in solution, said apparatus comprising in combination:

means for establishing an electric field across said solution to move said macromolecules through said solution at a velocity proportional to said electrophoretic mobility in a direction parallel with said electric field;

laser means for generating a light beam of monochromatic electromagnetic radiation incident on said macromolecules, said light beam being scattered by said macromolecules to provide a frequency distribution representative of said diffusion coefficient and a Doppler shift proportional to said electrophoretic mobility of said macromolecular polymer; and detector means for analyzing said scattered light to determine said electrophoretic mobility and said diffusion coefficient of said macromolecular polymer in solution.

* * * * *